United States Patent
Tanaka et al.

(10) Patent No.: US 7,957,872 B2
(45) Date of Patent: Jun. 7, 2011

(54) SHIFT CONTROL APPARATUS OF A CONTINUOUSLY VARIABLE TRANSMISSION AND METHOD OF DETERMINING WHETHER SHIFT CONTROL APPARATUS IS OPERATING NORMALLY

(75) Inventors: Naoto Tanaka, Okazaki (JP); Shinya Toyoda, Nissin (JP); Akira Hino, Toyota (JP); Yasunari Matsui, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 201 days.

(21) Appl. No.: 12/484,619

(22) Filed: Jun. 15, 2009

(65) Prior Publication Data

US 2009/0319144 A1 Dec. 24, 2009

(30) Foreign Application Priority Data

Jun. 20, 2008 (JP) .................................. 2008-161276

(51) Int. Cl.
*G06F 19/00* (2006.01)
(52) U.S. Cl. .......................................... 701/61; 701/58
(58) Field of Classification Search .................. 701/61, 701/51, 55, 58, 60; 477/34, 37, 46, 68; 192/3.51, 192/3.54, 3.61
See application file for complete search history.

(56) References Cited

U.S. PATENT DOCUMENTS 4,785,690 A * 11/1988 Yokoyama et al. ............. 477/45

FOREIGN PATENT DOCUMENTS

| JP | 60-157553 | 8/1985 |
| JP | 62-175230 | 7/1987 |
| JP | 1-266022 | 10/1989 |
| JP | 6-280951 | 10/1994 |
| JP | 7-286665 | 10/1995 |
| JP | 8-127261 | 5/1996 |
| JP | 8-233083 | 9/1996 |
| JP | 2002-283880 | 10/2002 |
| JP | 2004-11727 | 1/2004 |
| JP | 2004-263714 | 9/2004 |
| JP | 2005-127456 | 5/2005 |

* cited by examiner

*Primary Examiner* — Richard M. Camby
(74) *Attorney, Agent, or Firm* — Oblon, Spivak, McClelland, Maier & Neustadt, L.L.P.

(57) ABSTRACT

The invention provides a shift control apparatus of a continuously variable transmission, which includes a feedback control portion which executes feedback control that brings an actual speed ratio close or equal to a target speed ratio, and a normal operation determining portion which determines whether the shift control apparatus is operating normally based on a difference between the actual speed ratio and the target speed ratio, and an amount of change in the actual speed ratio and an amount of change in the target speed ratio during a predetermined interval.

3 Claims, 8 Drawing Sheets

| | C1 CLUTCH | B1 BRAKE |
|---|---|---|
| FORWARD | O | |
| REVERSE | | O |

O : APPLIED

FIG. 9 e : DIFFERENCE (= $\gamma^* - \gamma$)
Δ$\gamma$ : AMOUNT OF CHANGE IN ACTUAL
SPEED RATIO (= $\gamma_1 - \gamma_2$)
Δ$\gamma^*$ : AMOUNT OF CHANGE IN TARGET
SPEED RATIO (= $\gamma^*_1 - \gamma^*_2$)
$\gamma$ max : MAXIMUM SPEED RATIO
$\gamma$ min : MINIMUM SPEED RATIO

SHIFT CONTROL APPARATUS OF A CONTINUOUSLY VARIABLE TRANSMISSION AND METHOD OF DETERMINING WHETHER SHIFT CONTROL APPARATUS IS OPERATING NORMALLY

INCORPORATION BY REFERENCE

The disclosure of Japanese Patent Application No. 2008-161276 filed on Jun. 20, 2008, including the specification, drawings and abstract is incorporated herein by reference in its entirety.

BACKGROUND OF THE INVENTION

1. Field of the Invention

The invention relates to a shift control apparatus of a continuously variable transmission (CVT) that continuously (i.e., steplessly) changes speed ratios. More particularly, the invention relates to a shift control apparatus that determines whether that shift control apparatus is operating normally, as well as to a method of determining whether a shift control apparatus is operating normally.

2. Description of the Related Art

A vehicle is known which has a continuously variable transmission that continuously changes speed ratios provided in a power transmitting path between an engine and driving wheels. In this continuously variable transmission, the actual speed ratio calculated based on the input shaft rotational speed and the output shaft rotational speed of the continuously variable transmission is normally shift-controlled to a target speed ratio determined based on the vehicle speed and accelerator operation amount, for example. Shifting in the continuously variable transmission is normally performed by a hydraulic control circuit in the continuously variable transmission. However, if a solenoid valve or the like arranged in the hydraulic control circuit fails, shift control is unable to be performed normally. Therefore, it is desirable to determine whether shift control will be performed normally.

Thus, Japanese Patent Application Publication No. 8-233083 (JP-A-8-233083) describes technology which calculates an absolute value of the difference between a target speed ratio of a continuously variable transmission (a toroidal-type continuously variable transmission) and the actual speed ratio of the continuously variable transmission, and determines that the continuously variable transmission is operating normally if the change in the absolute value of that difference is small. Also, Japanese Patent Application Publication No. 8-127261 (JP-A-8-127261) describes technology that determines whether shift control is normal based on whether a difference between a target speed ratio and an actual speed ratio continues to exceed a set value for a predetermined period of time.

In addition to a shift control solenoid valve, a plurality of other valves, such as linear solenoid valves which control the line pressure, i.e., the base pressure, are also provided in the hydraulic control circuit in JP-A-8-233038 and JP-A-8-127261 and the like. For example, if a linear solenoid valve that controls the line pressure fails, sufficient line pressure will no longer be able to be supplied to the various valves in the hydraulic control circuit. As a result, the difference between the actual speed ratio and the target speed ratio will increase so it will be determined that shift control will not be able to be performed normally. That is, even if the shift control solenoid valve is operating normally, it will be determined that an abnormally has occurred in the shift control apparatus. In this way, because it will be determined that shift control is abnormal due to the failure of another part, even if the shift control solenoid valve is operating normally, it is not possible to accurately determine whether the shift control solenoid valve is operating normally by only the determination based on that difference.

SUMMARY OF THE INVENTION

This invention thus provides a shift control apparatus of a continuously variable transmission that changes gear ratios continuously (i.e., steplessly), which can accurately determine whether the shift control apparatus is operating normally, as well as a method for determining whether a shift control apparatus of a continuously variable transmission that changes gear ratios continuously (i.e., steplessly) is operating normally.

A first aspect of the invention relates to a shift control apparatus of a continuously variable transmission. The shift control apparatus includes a feedback control portion which executes feedback control that brings an actual speed ratio close or equal to a target speed ratio, and a normal operation determining portion which determines whether the shift control apparatus is operating normally based on a difference between the actual speed ratio and the target speed ratio, and an amount of change in the actual speed ratio and an amount of change in the target speed ratio during a predetermined interval.

Providing the normal operation determining means that determines whether the shift control apparatus is operating normally based on the difference between the actual speed ratio and the target speed ratio, as well as the amounts of change in those speed ratios during a predetermined interval, makes it possible to accurately determine whether shift control solenoid valves are operating normally. That is, the reliability of that determination is improved because the determination is made based on the amounts of change as well as the difference.

A second aspect of the invention relates to a method of determining whether a shift control apparatus of a continuously variable transmission is operating normally. This method includes executing feedback control that brings an actual speed ratio close or equal to a target speed ratio, and determining whether the shift control apparatus is operating normally based on a difference between the actual speed ratio and the target speed ratio, and an amount of change in the actual speed ratio and an amount of change in the target speed ratio during a predetermined interval.

A third aspect of the invention relates to a method of determining whether a shift control apparatus of a continuously variable transmission is operating normally. This method includes executing feedback control that brings an actual speed ratio close or equal to a target speed ratio, calculating a difference between the actual speed ratio and the target speed ratio, calculating an amount of change in the actual speed ratio and an amount of change in the target speed ratio during a predetermined interval, and determining that the shift control apparatus is operating normally when i) the difference is equal to or less than a predetermined-value, and ii) the difference between the amount of change in the actual speed ratio and the amount of change in the target speed ratio is equal to or less than a first predetermined value, or the ratio of the amount of change in the actual speed ratio to the amount of change in the target speed ratio is within a second predetermined value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF AN EMBODIMENT

In the following description and the accompanying drawings, the present invention will be described in more detail in terms of an example embodiment.

Figure 1:
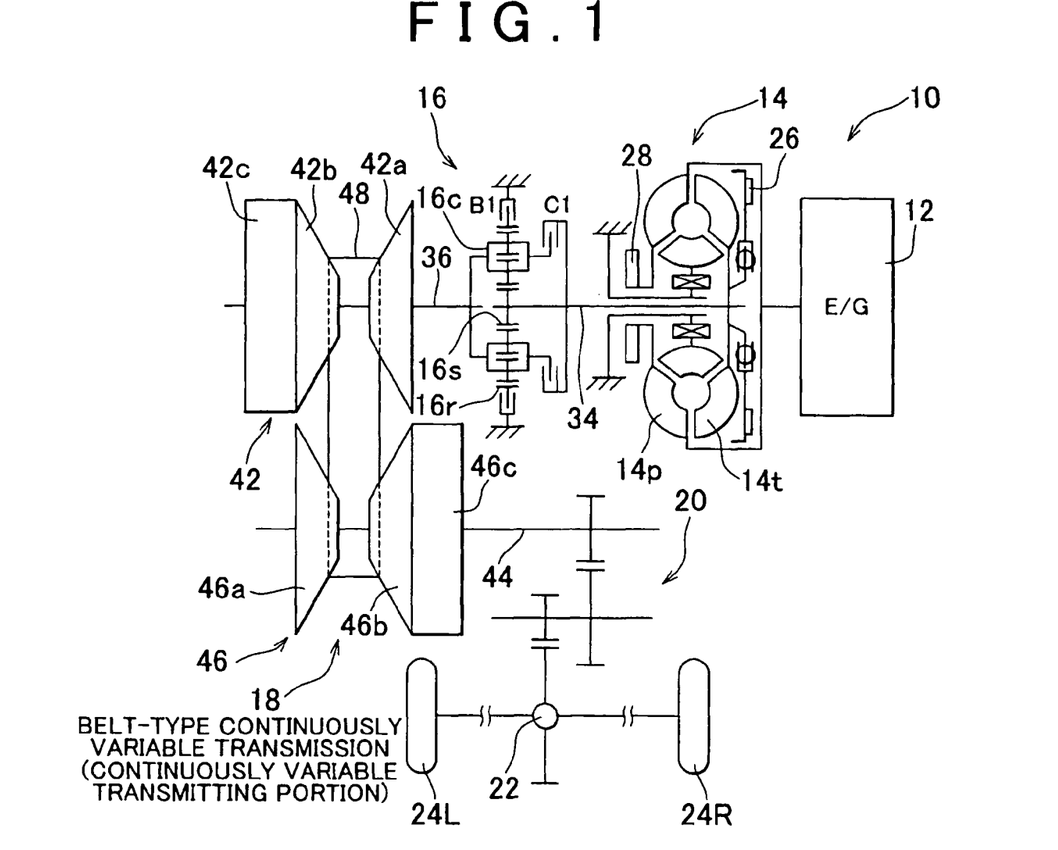
FIG. 1 is a skeleton view of a vehicular power transmitting device according to an example embodiment of the invention.

FIG. 1 is a skeleton view of a vehicular power transmitting device 10 according to one example embodiment of the invention. This vehicular power transmitting device 10 is a transverse mounted automatic transmission which is preferably employed in a FF (front engine-front drive) vehicle, and includes an engine 12 that serves as the power source for running. Output from the engine 12, which is an internal combustion engine in this example embodiment, is transmitted from a crankshaft of the engine 12 to a final reduction gear 22 via a torque converter 14 that serves as a fluid power transmitting device, a forward-reverse switching apparatus 16, an input shaft 36, a belt-type continuously variable transmission (hereinafter simply referred to as "belt-type CVT") 18, an output shaft 44, and reduction gears 20. From the final reduction gear 22, the output it is distributed to left and right driving wheels 24L and 24R. Incidentally, the belt-type CVT 18 in this example embodiment may correspond to a continuously variable transmission of the invention.

The torque converter 14 includes a pump impeller 14$p$ that is connected to the crankshaft of the engine 12, and a turbine runner 14$t$ that is connected to the forward-reverse switching apparatus 16 via a turbine shaft 34. The torque converter 14 transmits power through fluid. Also, a lock-up clutch 26 is provided between the pump impeller 14$p$ and the turbine runner 14$t$. This lock-up clutch 26 is switched between being applied and released by switching the supply of hydraulic pressure to an apply side fluid chamber and a release side fluid chamber using a switching valve or the like in a hydraulic control apparatus, not shown. When the lock-up clutch 26 is completely applied, the pump impeller 14$p$ and the turbine runner 14$t$ rotate together as a single unit. A mechanical oil pump 28 that generates hydraulic pressure for controlling a shift in the belt-type CVT 18, generating belt squeezing force, and supplying lubrication oil to various parts is provided with the pump impeller 14$p$.

Figure 2:
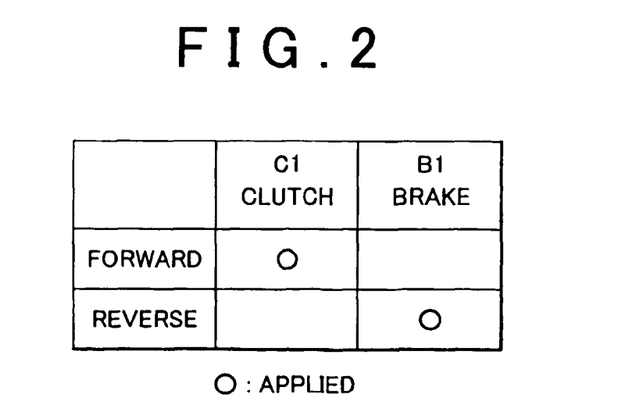
FIG. 2 is a clutch and brake application chart showing the operating states of the vehicular power transmitting device in FIG. 1.

The forward-reverse switching apparatus 16 mainly includes a double-pinion type planetary gear set in which the turbine shaft 34 of the torque converter 14 is integrally connected to a sun gear 16$s$ and the input shaft 36 of the belt-type CVT 18 is integrally connected to a carrier 16$c$. Meanwhile, the carrier 16$c$ and the sun gear 16$s$ may be selectively connected via a forward clutch C1, and a ring gear 16$r$ may be selectively fixed to a housing by a reverse brake B1. The forward clutch C1 and the reverse brake B1 are both hydraulic friction apply devices that are frictionally applied by hydraulic cylinders. As shown in FIG. 2, when the forward clutch C1 is applied and the reverse brake B1 is released, the forward-reverse switching apparatus 16 rotates as a single unit, thereby establishing a forward power transmitting path such that forward rotation is transmitted to the belt-type CVT 18 without a reduction in rotational speed. On the other hand, when the reverse brake B1 is applied and the forward clutch C1 is released, the forward-reverse switching apparatus 16 establishes a reverse power transmitting path in which the input shaft 36 rotates in the direction opposite that of the turbine shaft 34 such that reverse rotation is transmitted to the belt-type CVT 18. Also, when both the forward clutch C1 and the reverse brake B1 are released, the forward-reverse switching apparatus 16 is in a neutral state (i.e., in a disconnected state) in which the transmission of power is interrupted.

The belt-type CVT 18 includes an input side variable pulley 42 with a variable effective radius that is provided on the input shaft 36 and functions as an input side member, an output side variable pulley 46 with a variable effective radius that is provided on the output shaft 44 and functions as an output side member, and a drive belt 48 that is wound around the variable pulleys 42 and 46 and functions as a power transmitting member that is in frictional contact with the variable pulleys 42 and 46. Power is transmitted via the frictional force between the drive belt 48 and the variable pulleys 42 and 46. The input side variable pulley 42 includes a fixed sheave 42$a$, a movable sheave 42$b$, and an input side hydraulic cylinder 42$c$. The fixed sheave 42$a$ is fixed to the input shaft 36. The movable sheave 42$b$ is provided on the input shaft 36 in such a manner that it is able to move in the axial direction of the input shaft 36 but unable to rotate relative to the input shaft 36. The input side hydraulic cylinder 42$c$ applies thrust to the movable sheave 42$b$, thereby changing a V groove width between the fixed sheave 42$a$ and the movable sheave 42$b$. Similarly, the output side variable pulley 46 includes a fixed sheave 46$a$, a movable sheave 46$b$, and an output side hydraulic cylinder 46$c$. The fixed sheave 46$a$ is fixed to the output shaft 44. The movable sheave 46$b$ is provided on the output shaft 44 in such a manner that it is able to move in the axial direction of the output shaft 44 but unable to rotate relative to the output shaft 44. The output side hydraulic cylinder 46$c$ applies thrust to the movable sheave 46$b$, thereby changing a V groove width between the fixed sheave 46$a$ and the movable sheave 46$b$. The winding radius (i.e., the effective radius) of the drive belt 48 can be changed by changing the V groove widths of the variable pulleys 42 and 46, which is done by controlling the hydraulic pressure in the input side hydraulic cylinder 42$c$ of the input side variably pulley 42. As a result, the speed ratio $\gamma$ (=input shaft rotational speed Nin/output shaft rotational speed Nout) can be changed continuously (i.e., in a non-stepped manner). Meanwhile, the squeezing force that squeezes the drive belt 48 is changed by controlling the hydraulic pressure in the output side hydraulic cylinder 46c of the output side variable pulley 46. Also, the drive belt 48 is made of many metal pieces that are sandwiched between two (left and right) steel bands each of which is composed of several layers of thin steel bands.

Figure 3:
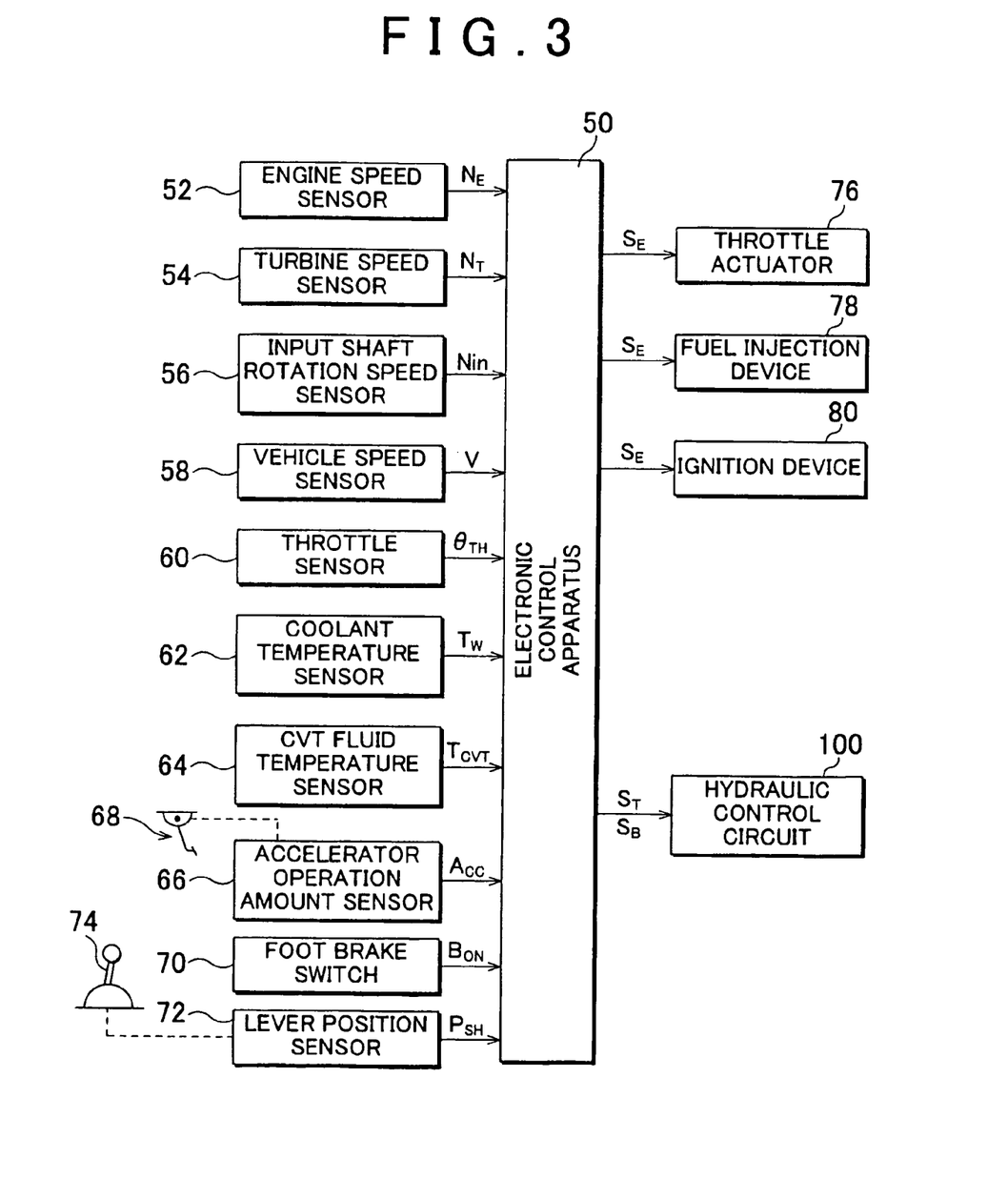
FIG. 3 is a block line diagram showing the main portions of a control system provided in a vehicle for controlling the vehicular power transmitting device and the like in FIG. 1.

FIG. 3 is a block line diagram showing the main portions of a control system provided in a vehicle for controlling the vehicular power transmitting device 10 and the like in FIG. 1. An electronic control apparatus 50 which may correspond to a shift control apparatus of the invention includes a so-called microcomputer that has a CPU, RAM, ROM, and an input/output interface and the like, for example. The CPU executes various controls, such as output control of the engine 12, shift control of the belt-type CVT 18, belt squeezing force control, and torque capacity control of the lock-up clutch 26 and the like, by signal processing according to programs stored in the ROM beforehand while using the temporary storage function of the RAM. The CPU may also be divided for engine control and hydraulic pressure control of the continuously variable transmission 18 and the lock-up clutch 26 and the like when necessary.

Various signals are supplied to the electronic control apparatus 50. Some of these signals include a signal indicative of the crankshaft rotational angle (position) ACR (°) and the crankshaft rotational speed that corresponds to the speed of the engine 12 (i.e., the engine speed) $N_E$ detected by an engine speed sensor 52, a signal indicative of the rotational speed (i.e., turbine speed) $N_T$ of the turbine shaft 34 detected by a turbine speed sensor 54, a signal indicative of the rotational speed (i.e., input shaft rotational speed) Nin of the input shaft 36, which is the input speed of the continuously variable transmission 18, detected by an input shaft rotational speed sensor 56, a signal indicative of the rotational speed (i.e., output shaft rotational speed) Nout of the output shaft 44, which is the output speed of the continuously variable transmission 18, i.e., the vehicle speed V that corresponds to the output shaft rotational speed Nout, detected by a vehicle speed sensor (i.e., an output shaft rotational speed sensor) 58, and a signal indicative of the opening amount $\theta_{TH}$ of an electronic throttle valve provided in an intake conduit of the engine 12, which is detected by a throttle sensor 60. Other signals supplied to the electronic control apparatus 50 include, for example, a signal indicative of the coolant temperature $T_W$ of the engine 12 detected by a coolant temperature sensor 62, a signal indicative of the fluid temperature $T_{CVT}$ in a hydraulic circuit of the continuously variable transmission 18 and the like detected by a CVT fluid temperature sensor 64, a signal indicative of the accelerator operation amount Acc, which is the operation amount of an accelerator pedal 68, detected by an accelerator operation amount sensor 66, a signal indicative of whether a foot brake which is a service brake is being operated, which is detected by a foot brake switch 70, and a signal indicative of the lever position (operating position) $P_{SH}$ of a shift lever 77 detected by a lever position sensor 72.

The electronic control apparatus 50 also outputs various signals, including engine output control command signals $S_E$ for controlling the output of the engine 12, such as a throttle signal that controls a throttle actuator 76 for controlling the opening and closing of the electronic throttle valve, an injection signal for controlling the quantity of fuel to be injected from a fuel injection device 78, and an ignition timing signal for controlling the ignition timing of the engine 12 by an ignition device 80, for example. The electronic control apparatus 50 also outputs various signals to a hydraulic control circuit 101, including i) shift control command signals $S_T$ for changing the speed ratio γ of the belt-type CVT 18, such as a command signal for driving a shift control solenoid valve DS1 and a shift control solenoid valve DS2 that control the flowrate of hydraulic fluid to the driving side hydraulic cylinder 42c, and ii) squeezing force control command signals $S_B$ for adjusting the squeezing force applied to the drive belt 48, such as a command signal for driving a linear solenoid valve SLS that regulates the belt squeezing force control pressure Pd and a command signal for driving a linear solenoid valve SLT and a linear solenoid valve SLS that control the line pressure PL.

The shift lever 74 is arranged near the driver's seat, for example, and is manually operated into one of five sequential lever positions, i.e., P, R, N, D, and L.

The P (Parking) position (range) is a park position for interrupting the power transmitting path of the vehicular power transmitting device 10, i.e., placing the vehicular power transmitting device 10 in a neutral state in which the transmission of power is interrupted and the output shaft 44 is mechanically prevented from rotating (i.e., locked) by a mechanical parking lock mechanism. The R (Reverse) position is a reverse running position for making the output shaft 44 rotate in the reverse direction. The N (Neutral) position is a neutral position for placing the vehicular power transmitting device 10 in a neutral state in which the transmission of power is interrupted. The D (Drive) position is a forward running position that executes shift control by establishing an automatic shift mode in a shift range within which shifting is possible by the belt-type CVT 18. The L (Low) position is an engine brake position in which a strong engine brake is applied. In this way, the P and N positions are non-driving positions which place the power transmitting path in a neutral state and are selected when the driver does not wish to drive the vehicle forward or backward, while the R, D, and L positions are driving positions which place the power transmitting path in a power transmittable state in which power is able to be transmitted along the power transmitting path and are selected when the driver wishes to drive the vehicle forward or backward.

Figure 4:
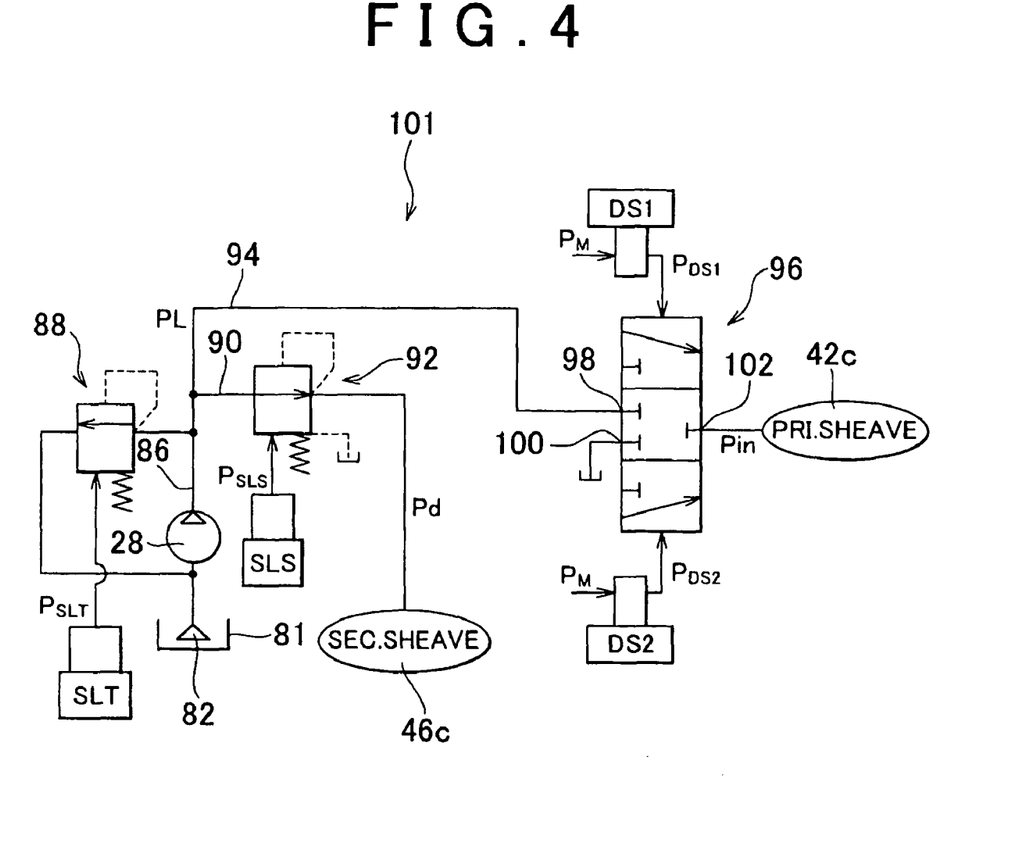
FIG. 4 is a simplified diagram of part of a hydraulic control circuit that supplies hydraulic fluid to an input side hydraulic cylinder and an output side hydraulic cylinder.

FIG. 4 is a simplified diagram of part of the hydraulic control circuit 101 that supplies hydraulic fluid to the input side hydraulic cylinder 42c and the output side hydraulic cylinder 46c. As shown in FIG. 4, hydraulic fluid is drawn up through a strainer 82 from an oil pan 81 by an oil pump 28 which increases the hydraulic pressure before supplying the hydraulic fluid to a fluid passage 86. The hydraulic pressure in the fluid passage 86, i.e., the discharge pressure of the oil pump 28, is regulated to line pressure PL by a pressure regulating valve 88 that is controlled based on a signal pressure $P_{SLT}$ output from the solenoid valve SLT. The hydraulic fluid at this line pressure PL is supplied to a fluid passage 90 that branches off from the fluid passage 86. The pressure of the hydraulic fluid supplied to the fluid passage 90 is regulated by a pressure regulating valve 92 provided in the fluid passage 90. The pressure regulating valve 92 is controlled based on a signal pressure $P_{SLS}$ output from a belt squeezing control solenoid valve SLS with the line pressure PL as the base pressure, and the pressure-regulated hydraulic fluid is supplied to the output side hydraulic cylinder 46c. In this way, the belt squeezing force applied to the drive belt 48 that is wound around the input side variable pulley 42 and the output side variable pulley 46 is adjusted by adjusting the hydraulic pressure Pd (i.e., the belt squeezing force control pressure Pd) applied to the output side hydraulic cylinder 46c (see FIG. 1).

Meanwhile, hydraulic fluid supplied from the fluid passage 86 to a fluid passage 94 is supplied to a speed ratio control valve 96. This speed ratio control valve 96 selectively allows and interrupts communication between an output port 102 of the input side hydraulic cylinder 42c of the input side variable pulley 42 and a line pressure supply port 98 and a drain port 100 using the shift control side solenoid valves DS1 and DS2. For example, when the shift control solenoid valve DS1 is on, the line pressure supply port 98 is communicated with the output port 102 such that line pressure PL is supplied to the input side hydraulic cylinder 42c. On the other hand, when the shift control solenoid valve DS2 is on, the output port 102 is communicated with the drain port 100 such that hydraulic fluid is discharged from the input side hydraulic cylinder 42c. In this way, the winding radius of the drive belt 48 that is wound around the input side variable pulley 42 can be appropriately changed by controlling the supply and discharge of hydraulic fluid to and from the input side hydraulic cylinder 42c, such that the speed ratio of the belt-type CVT 18 changes continuously (i.e., is a non-stepped manner). Also, the line pressure PL in this example embodiment is controlled by the pressure regulating valve 88 via the solenoid valve SLT, and the belt squeezing force control pressure Pd [MPa] supplied to the pressure chamber of the output side hydraulic cylinder 46c is controlled by the pressure regulating valve 92 via the belt squeezing pressure control solenoid valve SLS, so the line pressure PL and the belt squeezing force control pressure Pd are able to be controlled independently of one another. Modulator pressure $P_M$ is the base pressure of both control pressure $P_{DS1}$ which is the output pressure of the solenoid valve DS1 that is duty controlled by the electronic control apparatus 50, and control pressure $P_{DS2}$ which is the output pressure of the solenoid valve DS2 that is duty controlled by the electronic control apparatus 50. This modulator pressure $P_M$ is regulated to a constant pressure by a modulator valve, not shown. Incidentally, various solenoid valves provided in the hydraulic control circuit 101 are appropriately controlled by the electronic control apparatus 50 based on various data supplied by the vehicle speed sensor and the accelerator operation amount sensor and the like, not shown.

Figure 5:
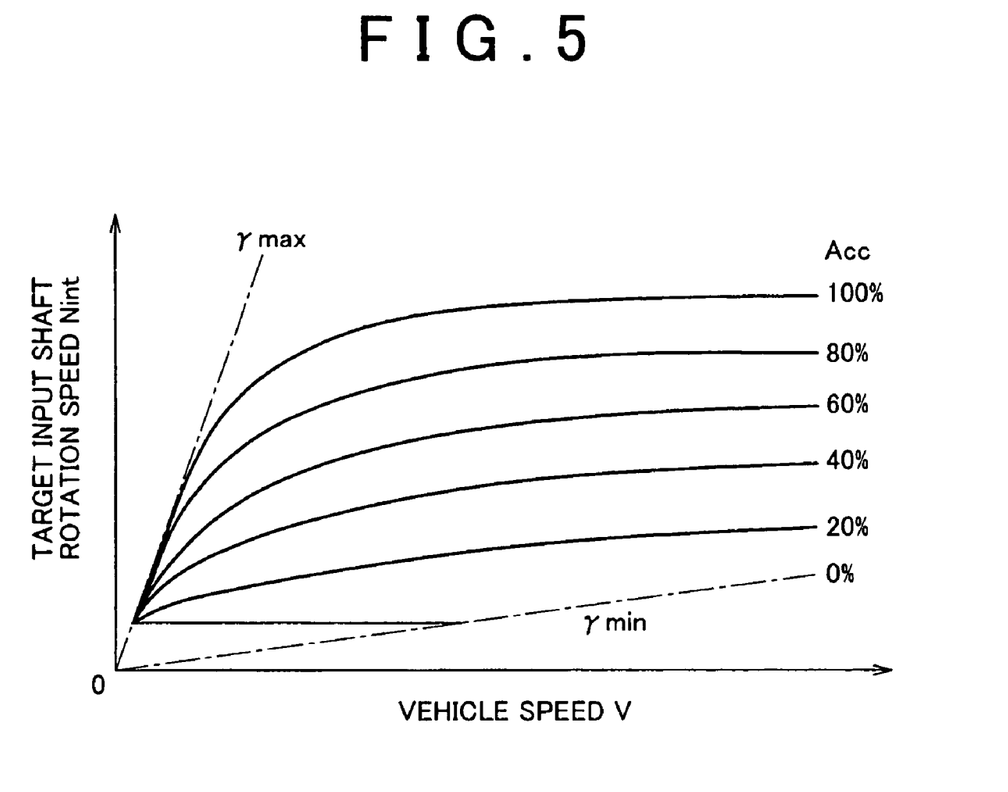
FIG. 5 is a graph showing one example of a shift map used when obtaining a target input rotational speed in shift control of a continuously variable transmission in FIG. 1.

A shift map which shows the relationship between the vehicle speed V and a target input shaft rotational speed Nint which is a target input rotational speed of the continuously variable transmission 18, with the accelerator operation amount Acc as the parameter, as shown in FIG. 5, for example, is obtained through testing in order achieve both drivability and fuel efficiency in the vehicle, and stored in advance. The target input shaft rotational speed Nint of the input shaft 36, which is a predetermined rotating member, is set based on the state of the vehicle which is indicated by the actual vehicle speed V and the accelerator operation amount Acc from that relationship (i.e., the shift map). The belt-type CVT 18 is shifted using feedback control, i.e., the speed ratio γ is changed in a continuous (i.e., non-stepped) manner using feedback control by changing the V groove widths of the variable pulleys 42 and 46, which is done by supplying or discharging hydraulic fluid to or from the driving side hydraulic cylinder 42c, according to the difference ΔNin (=Nint−Nin) between the set target input shaft rotational speed Nint and the actual input shaft rotational speed Nin (hereinafter referred to as the "actual input shaft rotational speed Nin" when there may be confusion between it and the target input shaft rotational speed Nint), so that the actual input shaft rotational speed Nin comes to match the set target input shaft rotational speed Nint.

The map shown in FIG. 5 corresponds to shift conditions, and may alternatively be, for example, an operational expression or the like obtained through testing with the accelerator operation amount Acc and the vehicle speed V or the like as parameters. In this map, the target input shaft rotational speed Nint is set such that the speed ratio γ increases as the vehicle speed V decreases and the accelerator operation amount Acc increases (i.e., such that the sped ratio γ is larger at a lower vehicle speed and with a greater accelerator operation amount Acc). Also, the vehicle speed V corresponds to the output shaft rotational speed Nout so the target input shaft rotational speed Nint, which is the target value for the input shaft rotational speed Nin, corresponds to a target speed ratio γ*(=Nint/Nout) and is set within a range between a minimum speed ratio γmin and a maximum speed ratio γmax of the continuously variable transmission 18.

However, the target input shaft rotational speed Nint may be set as it is as the target value of the input shaft rotational speed Nin, but preferably, a basic target input shaft rotational speed Nint_bc, which is a value obtained after processing the target input shaft rotational speed Nint according to the running state, e.g., while accelerating, decelerating (i.e., coasting), in the middle of shifting or the like, is set, and a transitional target input shaft rotational speed Nint_trs, which is a final target value of the input shaft rotational speed Nin, is set based on that basic target input shaft rotational speed Nint_bc. Accordingly, in this case, the continuously variable transmission 18 is shifted using feedback control according to the difference ΔNint_trs (=Nint_trs−Nin) between that transitional target input shaft rotational speed Nint_trs and the actual input shaft rotational speed Nin, so that the actual input shaft rotational speed Nin comes to match the transitional target input shaft rotational speed Nint_trs.

Figure 6:
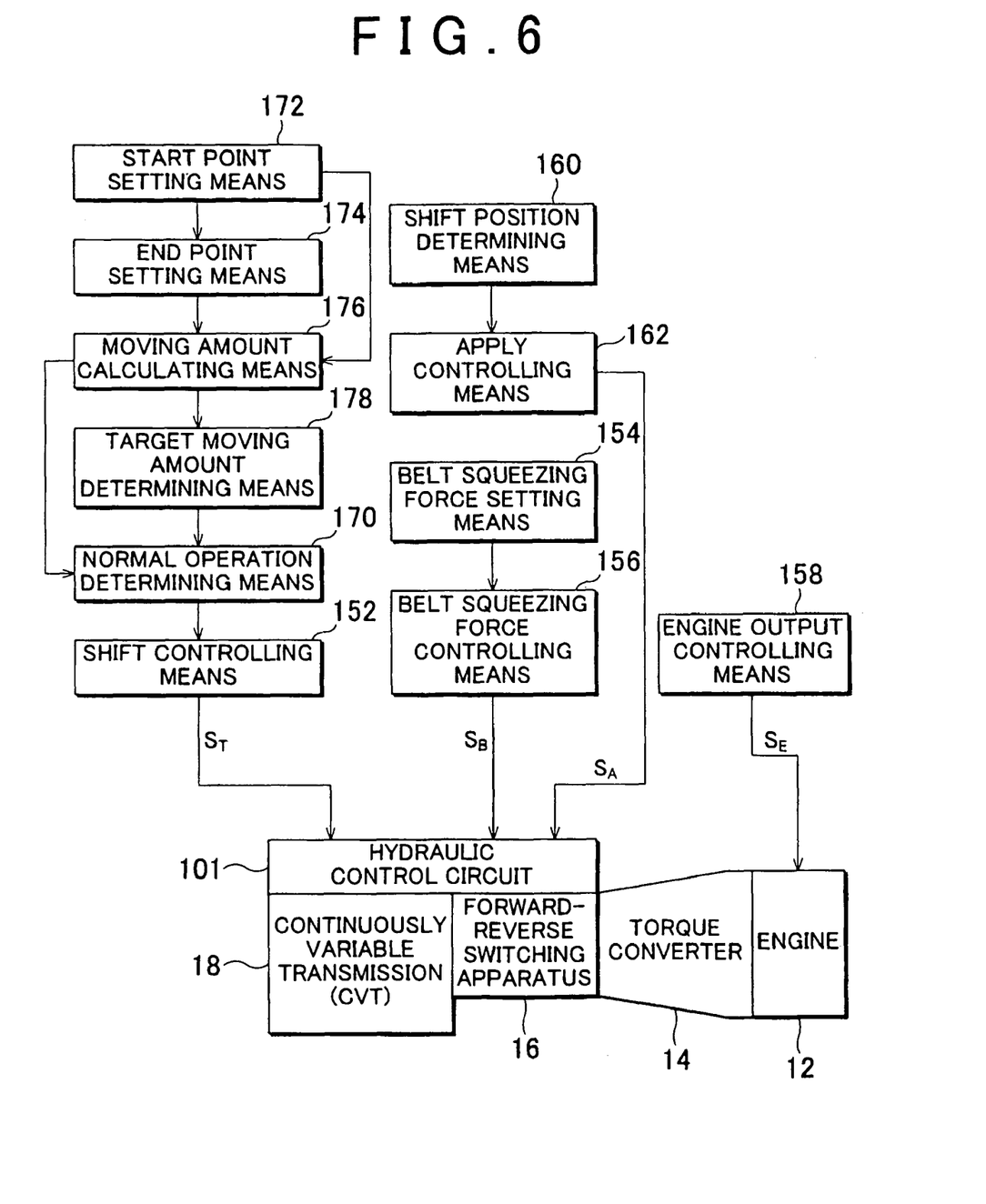
FIG. 6 is a functional block line diagram showing the main control functions of an electronic control apparatus shown in FIG. 3.

FIG. 6 is a functional block line diagram showing the main control functions of the electronic control apparatus 50. Shift controlling means 152 in FIG. 6 sequentially sets the target input shaft rotational speed Nint corresponding to the target speed ratio γ*(=Nint/Nout) based on the state of the vehicle as indicated by the actual vehicle speed V and the accelerator operation amount Acc, according to a shift map (shift conditions) stored in advance, such as that shown in FIG. 5, for example.

Then, the shift controlling means 152 shifts the continuously variable transmission 18 by executing feedback control that controls the winding radius (i.e., the effective radius) of the drive belt 48 on the driving side pulley 42 so that the actual speed ratio γ (=Nin/Nout) of the continuously variable transmission 18 approaches the target speed ratio γ*. When described focusing on the actual input shaft rotational speed Nin, the shift controlling means 152 shifts the continuously variable transmission 18 using feedback control according to the difference ΔNin (=Nint−Nin) between the actual input shaft rotational speed Nin and the set target input shaft rotational speed Nint, so that the actual input shaft rotational speed Nin comes to match the set target input shaft rotational speed Nint, i.e., to eliminate the difference ΔNin. That is, the shift controlling means 152 shifts the continuously variable transmission 18 by controlling the supply and discharge of hydraulic fluid to and from the driving side hydraulic cylinder (i.e., the driving side hydraulic actuator) 42c. More specifically, the shift controlling means 152 outputs a shift control command signal (hydraulic pressure command) $S_T$ to the hydraulic control circuit 101. This shift control command signal $S_T$ changes the V groove widths of the variable pulleys 42 and 46 by executing feedback control that controls the flowrate $Q_{CVT}$ of hydraulic fluid to the driving side hydraulic cylinder 42c, so as to continuously (i.e., steplessly) change the speed ratio γ. Here, in this feedback control, the flowrate $Q_{CVT}$ of the hydraulic fluid to the driving side hydraulic cylinder 42c corresponds to the change rate in the speed ratio γ during a shift (i.e., the shift speed), and is determined by the control method which is set in advance.

Figure 7:
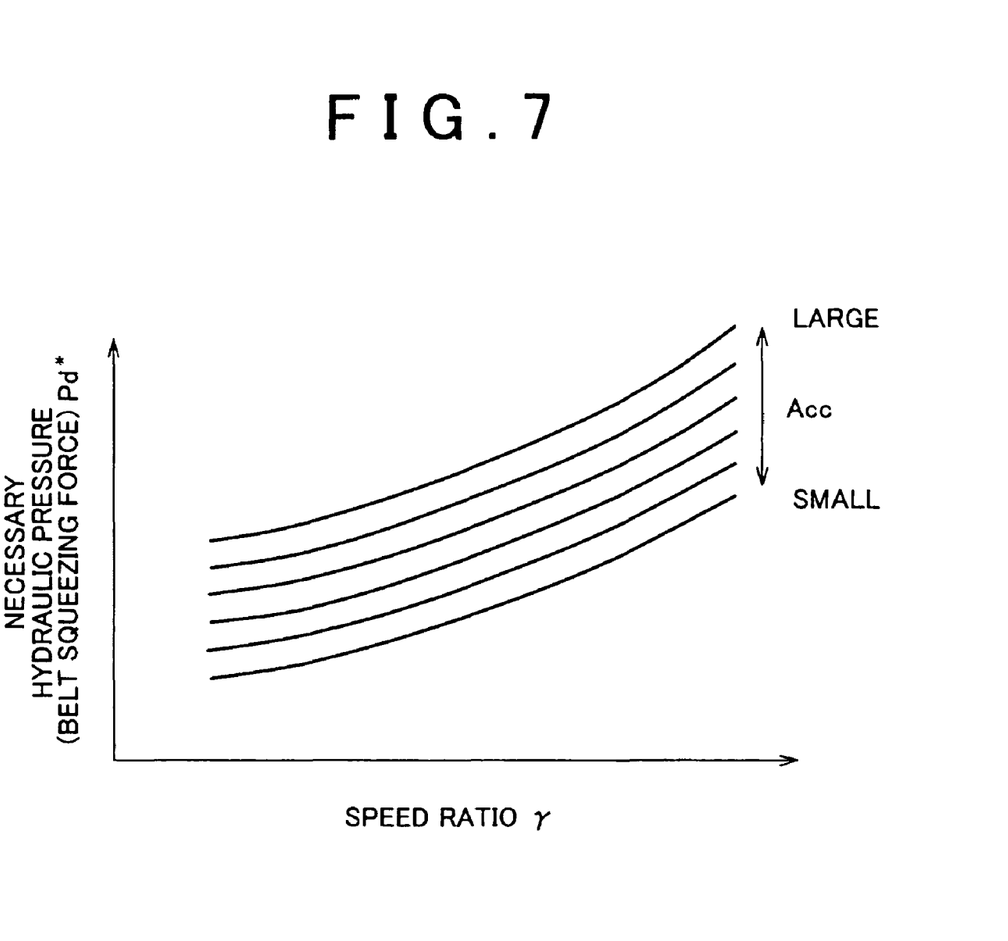
FIG. 7 is a graph showing one example of a necessary hydraulic pressure map for obtaining the necessary hydraulic pressure for a speed ratio and the like in squeezing force control of the continuously variable transmission in FIG. 1.

Belt squeezing force setting means 154 sets a belt squeezing force Pd* from a belt squeezing force map such as that shown in FIG. 7, for example, which is obtained in advance through testing and stored. The belt squeezing force Pd* is set based on the vehicle state as indicated by the actual accelerator operation amount Acc and the actual speed ratio $\gamma$ (=Nin/Nout) calculated by the electronic control apparatus 50 based on the actual input shaft rotational speed Nin and the actual output shaft rotational speed Nout. That is, the belt squeezing force setting means 154 sets the belt squeezing pressure Pd of the output side hydraulic cylinder 46c in order to obtain the belt squeezing force Pd*. Incidentally, when the vehicle speed V is equal to or less than a minimum vehicle speed at which the speed ratio can be detected, the actual speed ratio $\gamma$ is unable to be calculated. Therefore, in this case, for example, the belt squeezing force setting means 154 sets the belt squeezing force Pd* and the belt squeezing pressure Pd presuming that that actual speed ratio $\gamma$ is the maximum speed ratio $\gamma$max.

Belt squeezing force controlling means 156 adjusts the belt squeezing pressure Pd so that the drive belt 48 does not slip. More specifically, the belt squeezing force controlling means 156 increases or decreases the belt squeezing force Pd* by outputting a squeezing force control command signal $S_B$ that adjusts the belt squeezing pressure Pd of the driven side hydraulic cylinder 46c to the hydraulic control circuit 101 to obtain the belt squeezing force Pd* set by the belt squeezing force setting means 154.

The hydraulic control circuit 101 controls the amount of hydraulic fluid supplied to and discharged from the driving side hydraulic cylinder 42c by operating the shift control solenoid valves DS1 and DS2 so that the belt-type CVT 18 shifts according to the shift control command signal $S_T$. The hydraulic control circuit 101 also adjusts the belt squeezing pressure Pd by operating the linear solenoid valve SLS so that the belt squeezing force Pd increases or decreases according to the squeezing force control command signal $S_B$.

Engine output controlling means 158 outputs engine output control command signals $S_E$, such as a throttle signal, an injection signal, or an ignition timing signal, to the throttle actuator 76, the fuel injection device 78, or the ignition device 80, respectively, in order to control the output of the engine 12. For example, the engine output controlling means 158 controls the engine torque TE by outputting a throttle signal that opens or closes the electronic throttle valve to the throttle actuator 76 in order to realize a throttle opening amount $\theta_{TH}$ according to the accelerator operation amount Acc.

Shift position determining means 160 determines the current lever position $P_{SH}$ as well as the operating history of the shift lever 74 based on the lever position $P_{SH}$, i.e., based on an ON signal for each lever position $P_{SH}$. For example, the shift position shifting means 160 makes a N→D shift determination, a N→R shift determination, a D position determination, a N position determination, or a R position determination or the like based on the lever position $P_{SH}$.

When the shift position determining means 160 determines that a N→D shift or a N→R shift has been performed, apply controlling means 162 outputs a shift command signal $S_A$ to the hydraulic control circuit 101. This shift command signal $S_A$ causes control pressure $P_{SLT}$ for gradually increasing the apply pressure in order to control the forward clutch C1 or the reverse brake B1 throughout the transition to the applied state so as to suppress shift shock to be output, as well as causes signal pressure $P_{SLS}$ to be output in order to regulate the line pressure PL. For example, the apply controlling means 162 outputs an apply transitional pressure command pressure to the hydraulic control circuit 101 as a command signal for duty controlling the linear solenoid valve SLT.

Normal operation determining means 170 determines whether shift control of the belt-type CVT 18 will be performed normally. More specifically, the normal operation determining means 170 determines whether the shift control solenoid valves DS1 and DS2 used in shift control are operating normally. Normally this determination can easily be made based on how close the speed ratio $\gamma$ comes to the minimum speed ratio $\gamma$min and the like, for example. However, if the linear solenoid valve SLS or the linear solenoid valve SLT or the like fails, the speed ratio $\gamma$ will be unable to reach the minimum speed ratio $\gamma$min. Therefore, with the method described above, it is not possible to determine whether the shift control solenoid valves DS1 and DS2 are operating normally. There is also a method by which the determination can be made based on the difference between the target speed ratio and the actual speed ratio, but the determination may be erroneous using only this difference if there is an electrical failure or the like. Therefore, the normal operation determining means 170 makes the determination based on how closely the actual speed ratio $\gamma$ follows the target speed ratio $\gamma^*$ during a shift in the belt-type CVT 18. More specifically, the normal operation determining means 170 determines whether the shift control solenoid valves DS1 and DS2 are operating normally based on the difference e between the target speed ratio $\gamma^*$ and the actual speed ratio $\gamma$ during a shift, and the amounts of change $\Delta\gamma^*$ and $\Delta\gamma$ in the target speed ratio $\gamma^*$ and the actual speed ratio $\gamma$ during a shift.

This normal operation determining means 170 is appropriately applied to a continuously variable transmission such as a belt-type continuously variable transmission that changes speed ratios continuously (i.e., steplessly) by changing the belt winding radius, or a toroidal-type continuously variable transmission that changes speed ratios continuously (i.e., steplessly) by changing the points of contact between input and output discs and power rollers.

The normal operation determining means 170 first sets a predetermined interval for measuring the amounts of change in the target speed ratio $\gamma^*$ and the actual speed ratio $\gamma$ during a shift. Start point setting means 172 then sets the start point of that interval. The start point setting means first determines whether the actual speed ratio $\gamma$ is within a predetermined speed ratio range (between A and B). Here, this predetermined speed ratio range (between A and B) is set so that it does not include the maximum speed ratio $\gamma$max or the minimum speed ratio $\gamma$min. This enables the determination regarding normal operation to be made unaffected by other parts such as the linear solenoid valve SLS and the linear solenoid valve SLT. Next, if it is determined that the actual speed ratio $\gamma$ is within the predetermined speed ratio range, the start point setting means 172 calculates a difference e (=$\gamma^*$−$\gamma$) between the target speed ratio $\gamma^*$ and the actual speed ratio $\gamma$, and determines whether the calculated difference e is equal to or less than a predetermined value C. If it is determined that the actual speed ratio $\gamma$ is within the predetermined speed ratio range and the difference e is equal to or less than the predetermined value C, the start point setting means 172 sets the actual speed ratio $\gamma$ at that time as the start point. Incidentally, the predetermined value C is a value that is obtained in advance either empirically or theoretically, and is set to a low value such that the start point is set while the target speed ratio $\gamma^*$ and the actual speed ratio $\gamma$ are substantially equal.

Once the actual speed ratio $\gamma_1$, which is the start point, has been set by the start point setting means 172, an end point of the interval for measuring the amounts of change is set by end point setting means 174. As the end point, for example, the end point setting means 174 sets i) a constant value $\gamma_2$ set as the end point in advance, ii) an actual speed ratio $\gamma_2$ that is set according to the actual speed ratio $\gamma_1$ which is the start point set by the start point setting means 172, or iii) an actual speed ratio $\gamma_2$ after a predetermined period of time (t) has passed after the start point is set. Also, the end point starting means 174 determines whether the actual speed ratio $\gamma$ has reached the speed ratio $\gamma_2$ set as the end point.

Moving amount calculating means 176 calculates the amounts of change in the target speed ratio $\gamma^*$ and the actual speed ratio $\gamma$. The amount of change $\Delta\gamma^*$ in the target speed ratio $\gamma^*$ is defined by the difference $\Delta\gamma^*$ ($=\gamma^*_1-\gamma^*_2$) between the target speed ratio $\gamma^*_1$ when the start point is set and the target speed ratio $\gamma^*_2$ when the end point is set. Also, the amount of change $\Delta\gamma$ in the actual speed ratio $\gamma$ is defined by the difference $\Delta\gamma^*$ ($=\gamma_1-\gamma_2$) between the actual speed ratio $\gamma_1$ when the start point is set and the actual speed ratio $\gamma_2$ when the end point is set.

Target moving amount determining means 178 determines whether the amount of change $\Delta\gamma^*$ in the target speed ratio $\gamma^*$ calculated by the moving amount calculating means 176 is greater than a predetermined value D. Here, the predetermined value D is set in advance either empirically or theoretically, and is set such that the determination regarding normal operation that is based on the amount of change will be sufficiently reliable. For example, if the determination regarding normal operation is made when the amount of change $\Delta\gamma^*$ in the target speed ratio $\gamma^*$ is small, the reliability of that determination will be low. Therefore, control is performed so that a determination regarding normal operation will not be made when the amount of change $\Delta\gamma^*$ is less than the predetermined value D.

The normal operation determining means 170 compares the amount of change $\Delta\gamma^*$ in the target speed ratio $\gamma^*$ with the amount of change $\Delta\gamma$ of the actual speed ratio $\gamma$ calculated by the moving amount calculating means 176. If the amounts of change are almost the same, the normal operation determining means 170 determines that the shift control solenoid valves DS1 and DS2 are operating normally. More specifically, for example, the normal operation determining means 170 calculates the difference f ($=\Delta\gamma^*-\Delta\gamma$) between the amounts of change and determines that the shift control solenoid valves DS1 and DS2 are operating normally when that difference f is a value equal to or less than a predetermined value close to zero. Alternatively, the normal operation determining means 170 calculates the ratio g ($=\Delta\gamma^*/\Delta\gamma$) of the amounts of change and determines that the shift control solenoid valves DS1 and DS2 are operating normally when that ratio g is a value equal to or less than a predetermined value close to 1.0. That is, the normal operation determining means 170 determines that the shift control solenoid valves DS1 and DS2 are operating normally when the difference e ($=\gamma^*-\gamma$) is equal to or less than a predetermined value and the amounts of change ($\Delta\gamma^*$ and $\Delta\gamma$) in a predetermined interval are substantially equal.

Figure 8:
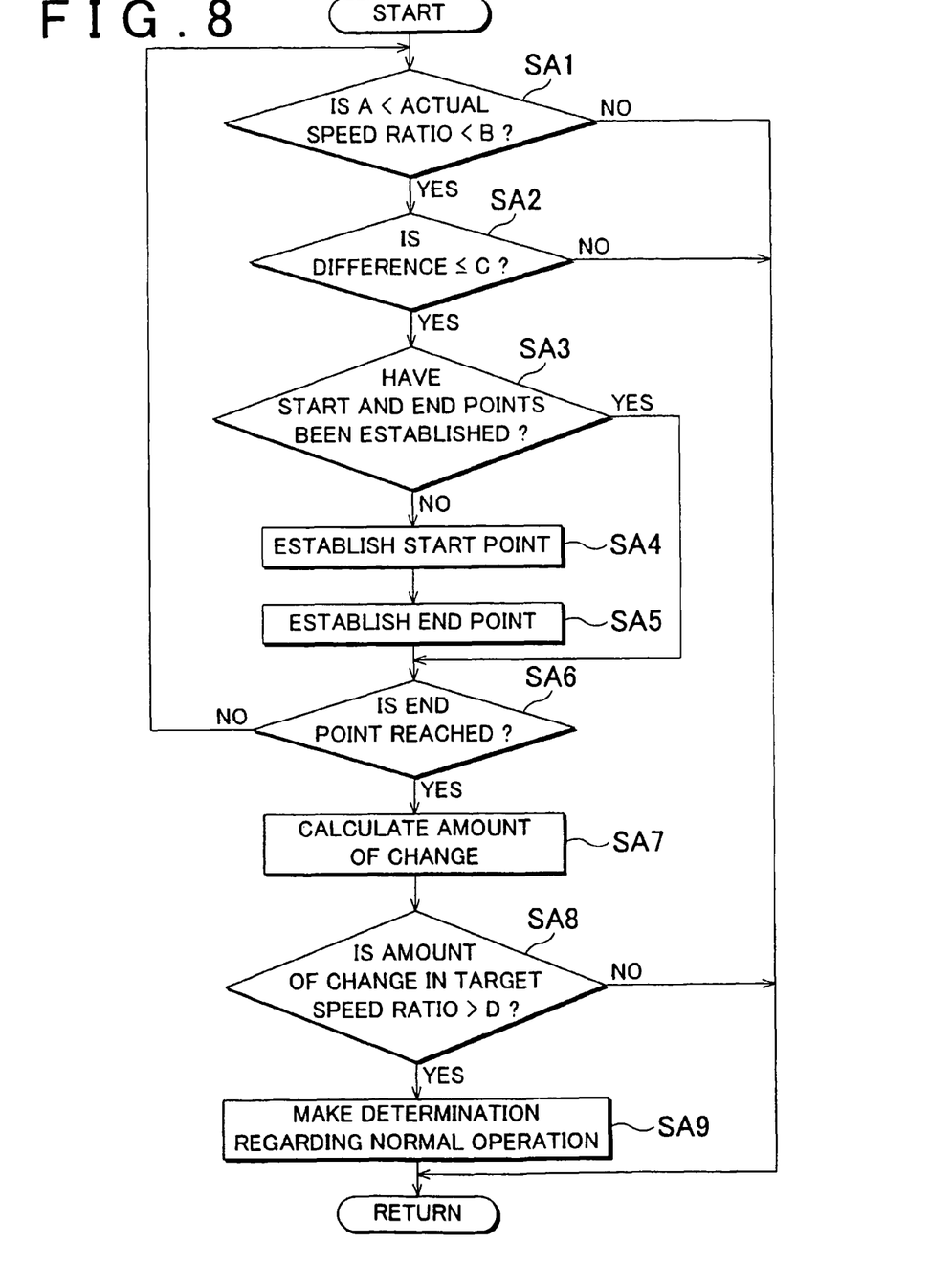
FIG. 8 is a flowchart illustrating the main portion of a control operation of the electronic control apparatus, i.e., a control operation that makes it possible to accurately determine whether shift control in a belt-type continuously variable transmission is normal.

FIG. 8 is a flowchart illustrating the main portion of a control operation of the electronic control apparatus 50, i.e., a control operation for determining whether shift control in the belt-type CVT 18 is normal. The routine in the flowchart is repeatedly executed in extremely short cycle times on the order to several milliseconds or several tens of milliseconds, for example.

First in step SA1 which corresponds to the start point setting means 172, the electronic control apparatus 50 determines whether the actual speed ratio $\gamma$ is within a predetermined speed ratio range (between A and B) that has been set in advance. If the determination in step SA1 is no, it is determined that it is not possible to determine whether shift control is normal so this cycle of the routine ends. If, on the other hand, the determination in step SA1 is yes, then in SA2 which corresponds to the start point setting means 172, the electronic control apparatus 50 calculates the difference e ($=\gamma^*-\gamma$) between the target speed ratio $\gamma^*$ and the actual speed ratio $\gamma$, and determines whether that difference e is equal to or less than a predetermined value C. If the determination in Step SA2 is no, i.e., if it is determined that the difference e is greater than the predetermined value C, then it is determined that it is not possible to determine whether shift control is normal so this cycle of the routine ends.

Figure 9:
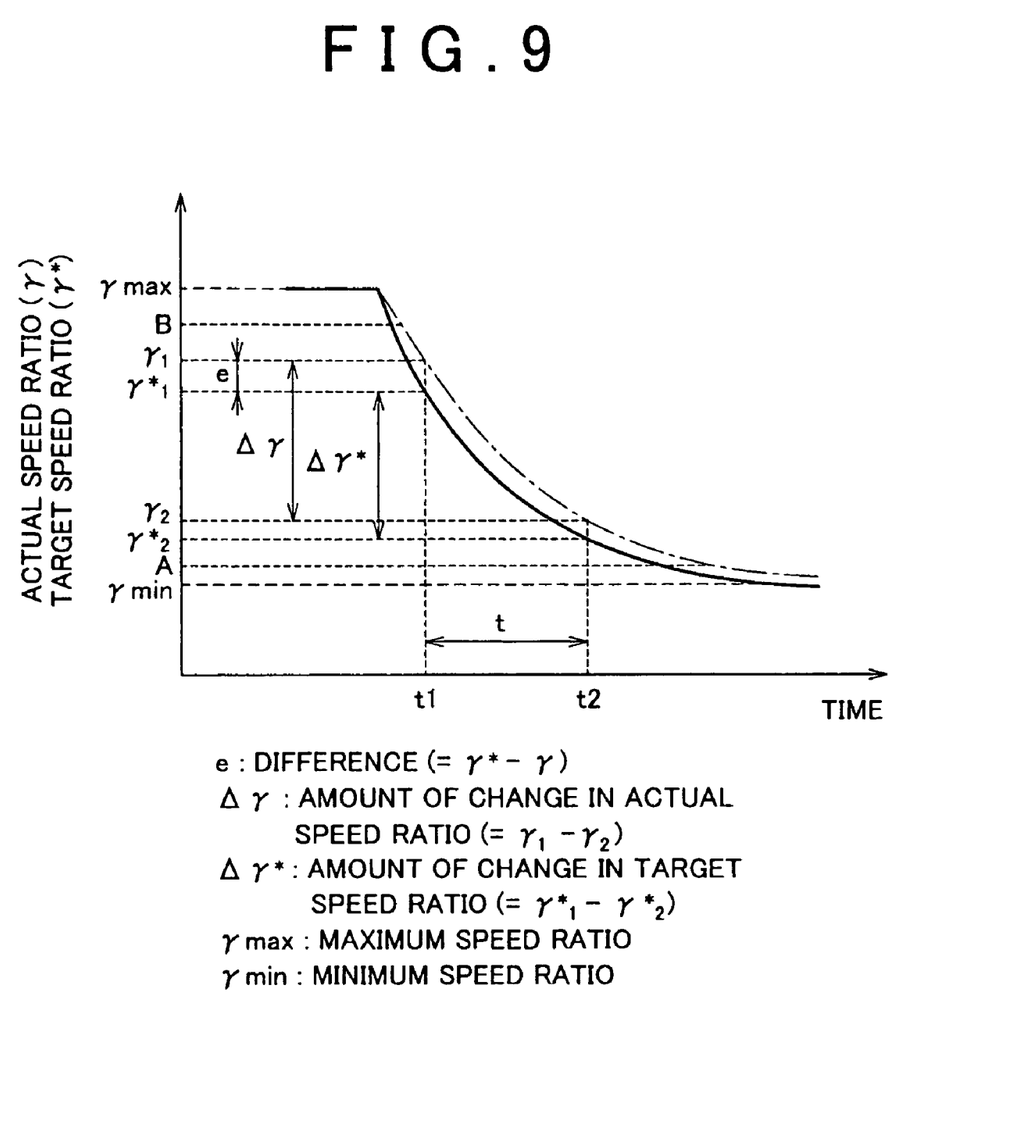
FIG. 9 is a graph showing the relationship between i) a target speed ratio and the actual speed ratio and ii) time, when the belt-type continuously variable transmission is upshifted.

If, on the other hand, the determination in step SA2 is yes, then in step SA3 which corresponds to the start point setting means 172 and the end point setting means 174, the electronic control apparatus 50 determines whether the start point and end point have already been set. If, the determination in step SA3 is no, then the electronic control apparatus 50 sets the start point in step SA4 which corresponds to the start point setting means 172. FIG. 9 is a graph showing the relationship between i) the target speed ratio $\gamma^*$ and the actual speed ratio $\gamma$ and ii) time, when the belt-type CVT 18 is upshifted, for example. Here, the parabola shown by the solid line represents the target speed ratio $\gamma^*$ and the parabola shown by the alternate long and short dash line represents the actual speed ratio $\gamma$. In FIG. 9, the start point is the actual speed ratio $\gamma_1$ at time t1, for example. Therefore, the actual speed ratio $\gamma_1$ at time t1 is within the predetermined speed ratio range (between A and B) and the difference e at time t1 is equal to or less than the predetermined value C.

Then in step SA5 which corresponds to the end point setting means 174, the electronic control apparatus 50 sets the end point. As described above, the end point is i) an actual speed ratio $\gamma_2$ set in advance, ii) an actual speed ratio $\gamma_2$ set according to the actual speed ratio $\gamma_1$ at the start point, or iii) an actual speed ratio $\gamma_2$ after a predetermined period of time (t) has passed after the start point is set. Once the start point and the end point have been set in steps SA4 and SA5, respectively, or the determination in step SA3 is yes, the electronic control apparatus 50 determines in step SA6, which corresponds to the end point setting means 174, whether the actual speed ratio $\gamma$ has reached the actual speed ratio $\gamma_2$ which is the end point. If the determination in step SA6 is no, the process returns to step SA1 and the steps are repeated. Incidentally, the start point and the end point set in steps SA4 and SA5, respectively, are stored and used in the next cycle of the routine. That is, the determination in step SA3 the next time the routine is executed will be yes.

If the determination in step SA6 is yes, then in step SA7 which corresponds to the moving amount calculating means 176, the electronic control apparatus 50 calculates the amount of change $\Delta\gamma^*$ in the target speed ratio $\gamma^*$ and the amount of change $\Delta\gamma$ in the speed ratio $\gamma$. Then in step SA8 which corresponds to the target moving amount determining means 178, the electronic control apparatus 50 determines whether the amount of change $\Delta\gamma^*$ in the target speed ratio $\gamma^*$ is greater than the predetermined value D. If the determination in step SA8 is no, it is determined that even if a determination regarding normal operation was made, it would not be sufficiently reliable so this cycle of the routine ends. If, on the other hand, the determination in step SA8 is yes, then the electronic control apparatus 50 determines in step SA9, which corresponds to the normal operation determining means 170, whether the shift control solenoid valves DS1 and DS2 are operating normally, based on the amount of change $\Delta\gamma^*$ in the target speed ratio $\gamma^*$ and the amount of change $\Delta\gamma$ in the actual speed ratio $\gamma$. Incidentally, the amount of change $\Delta\gamma^*$ in the target speed ratio $\gamma^*$ is the difference $\Delta\gamma^*$ between the target speed ratio $\gamma^*_1$ at the start point (at time t1) and the target speed ratio $\gamma^*_2$ at the end point (at time t2) in FIG. 9. Also, the amount of change $\Delta\gamma$ in the target speed ratio $\gamma$ is the difference $\Delta\gamma$ between the target speed ratio $\gamma_1$ at the start point and the target speed ratio $\gamma_2$ at the end point in FIG. 9. The determination regarding normal operation is made by calculating the difference f between these amounts of change or the ratio g of these amounts of change, for example. If the difference f is equal to or less than a predetermined value, or if the ratio g is near 1.0, for example, it is determined that the shift control solenoid valves DS1 and DS2 are operating normally. If, on the other hand, the difference f is greater than the predetermined value or if the ratio g is not close to 1.0, it is determined that the shift control solenoid valves DS1 and DS2 are not operating normally.

As described above, according to this example embodiment, the normal operation determining means 170 is provided which determines whether the shift control solenoid valves are operating normally based on the difference e between the actual speed ratio $\gamma$ and the target speed ratio $\gamma^*$, and the amounts of change ($\Delta\gamma^*$ and $\Delta\gamma$) in the target speed ratio $\gamma^*$ and the actual speed ratio $\gamma$ during the predetermined interval (i.e., between the start point and the end point). Therefore, it is possible to accurately determine whether the shift control solenoid valves are operating normally. That is, in this example embodiment, the reliability of that determination is improved because the determination is made based on the amounts of change ($\Delta\gamma^*$ and $\Delta\gamma$) as well as the difference e.

Also, according to the example embodiment, the normal operation determining means 170 determines that the shift control solenoid valves DS1 and DS2 are operating normally when the difference e between the actual speed ratio $\gamma$ and the target speed ratio $\gamma^*$ is equal to or less than the predetermined value C and the amount of change $\Delta\gamma$ in the actual speed ratio $\gamma$ and the amount of change $\Delta\gamma^*$ in the target speed ratio $\gamma^*$ in the predetermined interval are substantially equal. As a result, it is possible to accurately determine whether the shift control solenoid valves DS1 and DS2 are operating normally.

Also, according to this example embodiment, the normal operation determining means 170 is operated within a speed ratio range that does not include the minimum speed ratio $\gamma$min and the maximum speed ratio $\gamma$max of the belt-type CVT 18. As a result, the determination can be made generally unaffected by devices other than the shift control solenoid valves.

Also, according to this example embodiment, the amount of change $\Delta\gamma$ in the actual speed ratio $\gamma$ and the amount of change $\Delta\gamma^*$ in the target speed ratio $\gamma^*$ are measured when the difference e between the actual speed ratio $\gamma$ and the target speed ratio $\gamma^*$ is equal to or less than the predetermined value C, so the reliability of the determination regarding normal operation based on the amounts of change ($\Delta\gamma$ and $\Delta\gamma^*$) improves.

While an example embodiment of the invention has been described in detail with reference to the drawings, it is to be understood that the invention may also be carried out in other modes.

For example, in the example embodiment described above, differences e are sequentially determined when the actual speed ratio $\gamma$ changes from the start point to the end point, but differences e do not necessarily have to be sequentially determined. For example, only the difference e at the start point may be determined.

Also, in the example embodiment described above, the current cycle of the routine ends when the difference e exceeds the predetermined value. However, it is conceivable that the difference e may temporarily increase due to some sort of change in the vehicle so the control may be such that the current cycle of the routine ends when the difference has remained above a predetermined value for a predetermined period of time which has been set in advance.

Also, in the example embodiment described above, the continuously variable transmission 18 is a continuously variable transmission that continuously changes speed ratios by controlling the winding radius of the belt. However, the invention may also be applied to another kind of continuously variable transmission such as a toroidal-type continuously variable transmission, for example.

Also, in the example embodiment described above, an internal combustion engine such as a gasoline engine (petrol) or a diesel engine or the like is widely used as the engine 12 which serves as the power source for running. In addition, an electric motor or the like may also be used together with the engine 12, as a secondary or auxiliary power source for running. Alternatively, it is also possible to use only an electric motor as the power source for running.

In the present invention, the normal operation determining means may determine that the shift control apparatus is operating normally when the difference between the actual speed ratio and the target speed ratio is equal to or less than a predetermined value, and the amount of change in the actual speed ratio and the amount of change in the target speed ratio during the predetermined interval are substantially equal.

According to the present invention, the normal operation determining means determines that the shift control apparatus is operating normally when the difference between the actual speed ratio and the target speed ratio is equal to or less than a predetermined value, and the amount of change in the actual speed ratio and the amount of change in the target speed ratio during the predetermined interval are substantially equal. Therefore, it is possible to accurately determine whether shift control solenoid valves are operating normally.

In the present invention, the normal operation determining means may make the determination when the actual speed ratio is within a speed ratio range that does not include a maximum speed ratio and a minimum speed ratio of a continuously variable transmitting portion of the continuously variable transmission.

According to the present invention, the normal operation determining means makes the determination within a speed ratio range that does not include the maximum speed ratio and the minimum speed ratio of the continuously variable transmitting portion of the continuously variable transmission. Therefore, the determination can be made generally unaffected by devices other than shift control solenoid valves.

In the present invention, the amount of change in the actual speed ratio and the amount of change in the target speed ratio may be measured when the difference between the actual speed ratio and the target speed ratio is equal to or less than a predetermined value.

According to the present invention, the amount of change in the actual speed ratio and the amount of change in the target speed ratio are measured when the difference between the actual speed ratio and the target speed ratio is equal to or less than a predetermined value. As a result, the reliability of the determination based on the amounts of change improves.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A shift control apparatus of a continuously variable transmission, comprising:
   a feedback control portion which executes feedback control that brings an actual speed ratio closer to a target speed ratio; and
   a normal operation determining portion which determines whether the shift control apparatus is operating normally based on a difference between the actual speed ratio and the target speed ratio, and amounts of change in the speed ratios during a predetermined interval,
   wherein the normal operation determining portion confirms normality when the difference between the actual speed ratio and the target speed ratio is equal to or less than a predetermined value, and the amount of change in the actual speed ratio and the amount of change in the target speed ratio during the predetermined interval are substantially equal to each other.

2. The shift control apparatus of a continuously variable transmission according to claim 1, wherein the normal operation determining portion is operated within a speed ratio range that does not include a maximum speed ratio and a minimum speed ratio of the continuously variable transmitting portion.

3. The shift control apparatus of a continuously variable transmission according to claim 2, wherein the amount of change in the actual speed ratio and the amount of change in the target speed ratio are measured when the difference between the actual speed ratio and the target speed ratio is equal to or less than the predetermined value.

* * * * *